United States Patent
Collier

(10) Patent No.: US 6,406,221 B1
(45) Date of Patent: Jun. 18, 2002

(54) BRIDGE PILLAR DEBRIS DEFLECTION APPARATUS

(76) Inventor: Forest Michael Collier, 1694 S. Rice Rd., Oaji, CA (US) 93023

( * ) Notice: Subject to any disclaimer, the term of this patent is extended or adjusted under 35 U.S.C. 154(b) by 0 days.

(21) Appl. No.: 09/514,898

(22) Filed: Feb. 28, 2000

Related U.S. Application Data

(60) Provisional application No. 60/122,784, filed on Mar. 4, 1999.

(51) Int. Cl.$^7$ ................................................ E02B 3/26
(52) U.S. Cl. ...................... 405/213; 405/212; 114/219; 114/220; 441/22
(58) Field of Search ................................ 405/212, 213; 114/219, 220; D12/168; 440/9; 441/22; 60/398; 290/53, 54, 42, 43; 415/4.2, 4.4, 7, 907; 416/86, DIG. 4

(56) References Cited

U.S. PATENT DOCUMENTS

| | | | | | |
|---|---|---|---|---|---|
| 445,910 | A | * | 2/1891 | Stein | 114/220 |
| 799,645 | A | * | 9/1905 | Grimm | 114/220 |
| 807,959 | A | * | 12/1905 | Padovanl | 114/220 |
| 876,170 | A | * | 1/1908 | Grant | 405/213 |
| 985,371 | A | * | 2/1911 | Roeth et al. | 405/213 |
| 3,145,685 | A | * | 8/1964 | Kulick, Sr. | 114/220 |
| 3,311,081 | A | * | 3/1967 | Parker | 114/220 |
| 3,528,383 | A | * | 9/1970 | Fetters | 114/220 |
| 3,593,531 | A | * | 7/1971 | Saadeh | 405/212 |
| 3,964,422 | A | * | 6/1976 | Boyd | 114/219 |
| 4,098,211 | A | * | 7/1978 | Files et al. | 114/219 |
| 4,351,257 | A | * | 9/1982 | Brown, Jr. | 114/219 |
| 4,378,749 | A | * | 4/1983 | Leblanc et al. | 114/220 |
| 4,628,850 | A | * | 12/1986 | Day et al. | 114/219 |
| 4,697,956 | A | * | 10/1987 | Plaisance | 405/213 |
| 4,773,349 | A | * | 9/1988 | McKinney | 114/219 |
| 4,841,893 | A | * | 6/1989 | Ellison | 114/219 |
| 4,872,805 | A | * | 10/1989 | Horiuchi et al. | 415/7 |
| 4,924,796 | A | * | 5/1990 | Duffy | 114/219 |
| 5,007,363 | A | * | 4/1991 | James | 114/219 |
| 5,013,272 | A | * | 5/1991 | Watkins | 114/219 |
| 5,409,199 | A | * | 4/1995 | Kahmann | 114/220 |
| 5,562,364 | A | * | 10/1996 | Darder-Alomar | 405/215 |
| 5,715,769 | A | * | 2/1998 | Mills | 114/220 |
| 5,911,189 | A | * | 6/1999 | Ryan | 114/230 |
| 5,937,644 | A | * | 8/1999 | Dipnall | 60/398 |
| 6,006,518 | A | * | 12/1999 | Geary | 60/398 |
| D425,461 | S | * | 5/2000 | Beyer-Olsen | D12/168 |
| D430,083 | S | * | 8/2000 | Spearin | D12/168 |
| 6,112,690 | A | * | 9/2000 | Anderson | 114/220 |
| 6,139,255 | A | * | 10/2000 | Vauthier | 415/7 |

* cited by examiner

*Primary Examiner*—Thomas B. Will
*Assistant Examiner*—Alexandra K. Pechhold
(74) *Attorney, Agent, or Firm*—Albert O. Cota

(57) ABSTRACT

A bridge pillar debris deflection apparatus (10), which attaches to a pillar supporting a structure located on a water way, such as a river or ocean. The apparatus (10) deflects debris to maintain the pillar clear from any unwanted build-up of rubbish. The apparatus utilizes at least one finned cylinder (30) that is rotatably held in place in front of a pillar (50) with an upper attachment bracket (26) and a lower attachment bracket (28). The cylinder is rotated by the force of the water impinging on a multiplicity of fins (44) extending from the outer surface of the cylinder to deflect the debris and prevent any accumulation. An axle (38) is positioned between the brackets and extends through the cylinder in the preferred embodiment. Any number of cylinders may be used in tandem, according to the need and environmental conditions. A variety of different brackets may be employed to attach the apparatus to a pillar or buttress, such as attaching plates (23), circumferential bands (22), sliding brackets and even roller-equipped, movable brackets (46) that glide up and down the pillar.

2 Claims, 4 Drawing Sheets

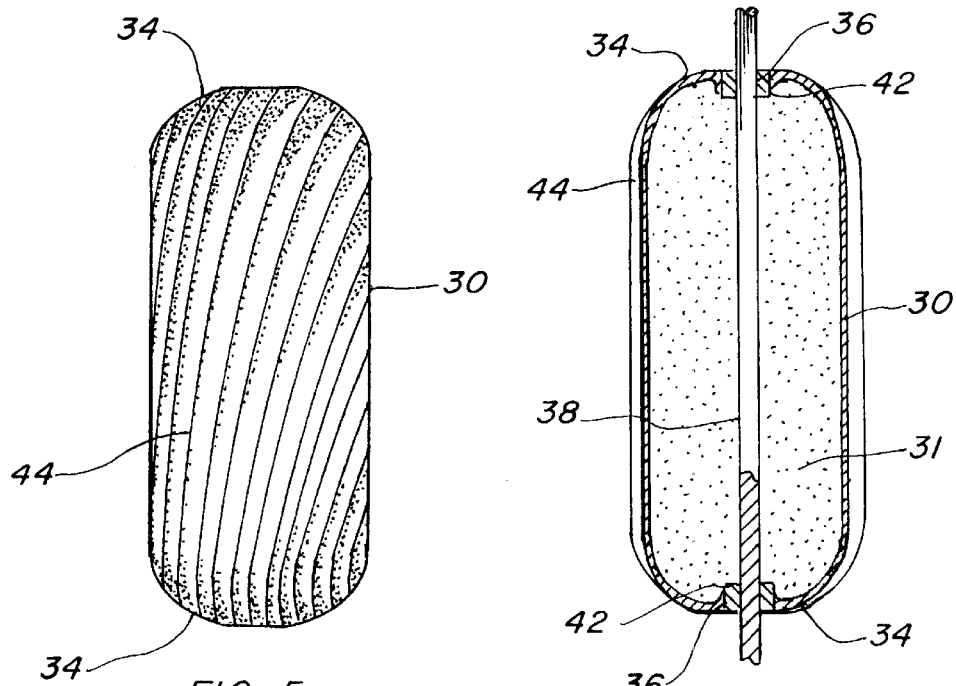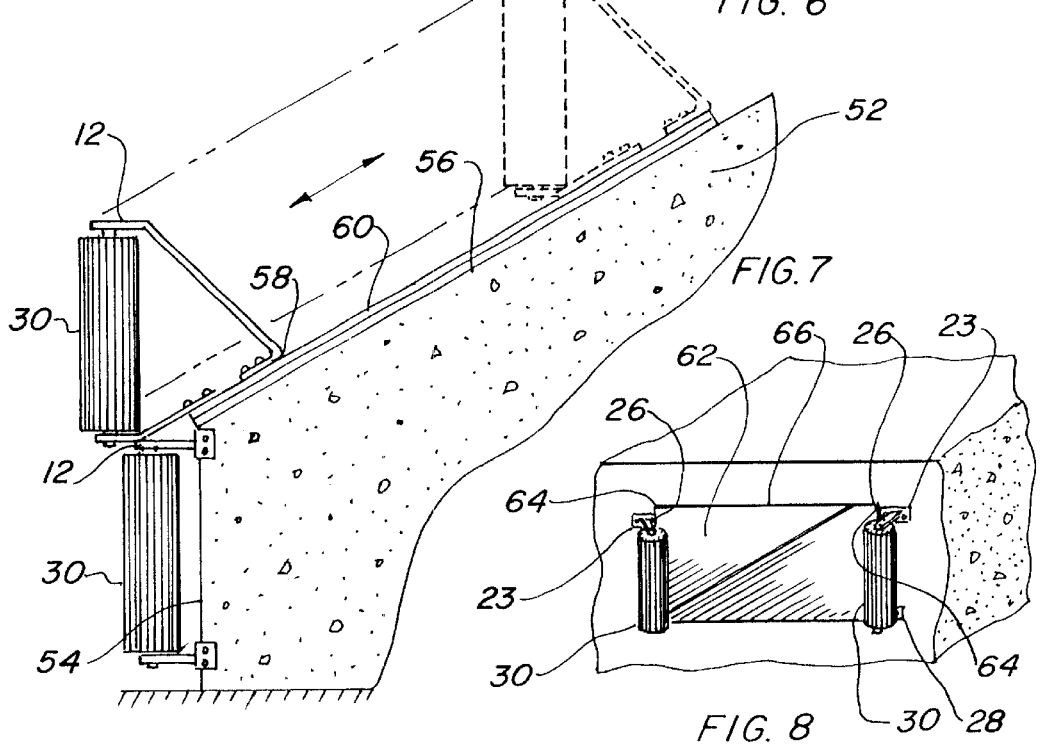

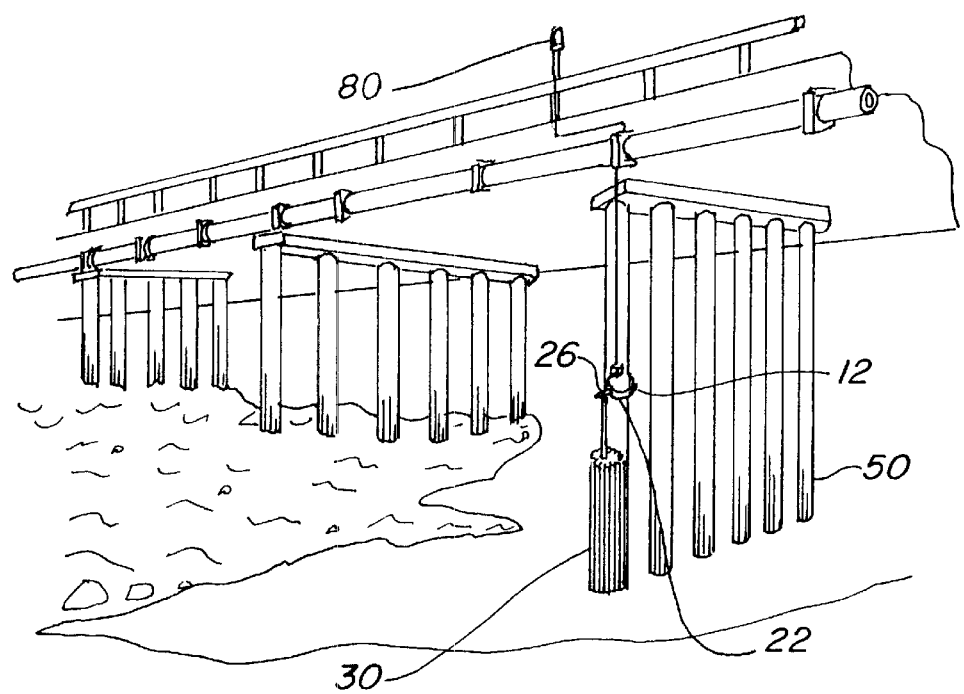
FIG. 9
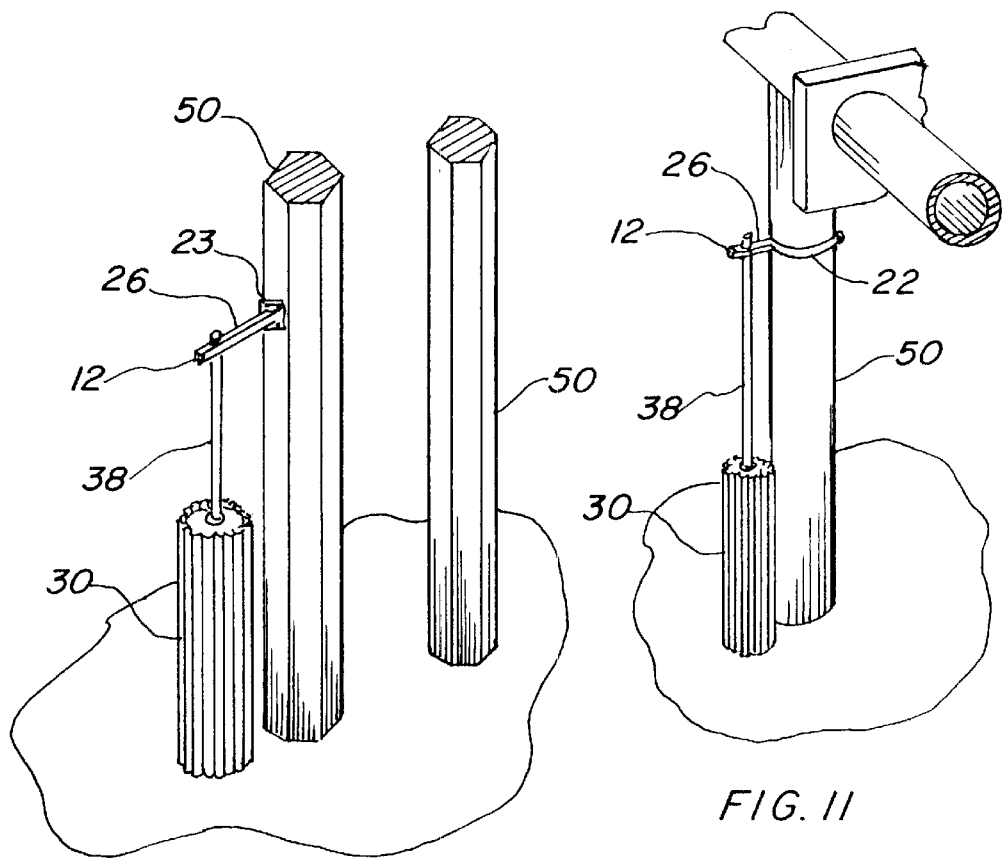
FIG. 10
FIG. 11

BRIDGE PILLAR DEBRIS DEFLECTION APPARATUS

This application claims benefit of provisional application No. 60/122,784, filed Mar. 4, 1999.

TECHNICAL FIELD

The invention pertains to the general field of debris deflecting apparatus and more particularly to an apparatus that when attached to a bridge pillar the apparatus rotates causing debris striking the pillar to be deflected downstream.

BACKGROUND ART

Passage over rivers, lakes, oceans and other waterways is usually traversed by means of bridge or a culvert which typically consists of a length of surface that is supported by a plurality of support structures, that are often constructed of concrete, wood or metal. Bridges that traverse a short distance may only require one of two rows of support structures at each end of the bridge, while longer bridges may have support structures along their entire length.

It would be beneficial for all bridges which utilize support structures if there was some means of maintaining the support structures free of any and all debris that may become caught and attached to the support structure. If support structures can be kept debris-free, their life spans can be extended for a significantly longer duration's.

Attempts have been made to provide some means of removing debris and dumping it back in the water at a non-objectionable location, or to deflect debris from the vulnerable structures by using bumpers, sharp edge pillars, screens upstream of the support structures etc., however, none have been entirely successful and few are in use today.

A search of the prior art did not disclose any patents that read directly on the claims of the instant invention, however the following U.S. patents are considered related:

| U.S. Pat. No. | Inventor | Issue Date |
| --- | --- | --- |
| 3,850,804 | Taylor | Nov. 26, 1974 |
| 3,872,006 | Abel | Mar. 18, 1975 |
| 5,618,415 | Johnson, Jr. | Apr. 8, 1997 |

Taylor in U.S. Pat. No. 3,850,804 teaches a traveling water screen unit that has an endless series of interconnected rectangular screens. Each screen has a frame that attaches to links or parallel chains secured by bolts. Debris carried by the flow of water in a channel is intercepted by lower upwardly-moving screens and is removed by backwash sprays from screens approaching an upper drive and in line support within the channel.

U.S. Pat. No. 3,872,006 issued to Abel is for an apparatus that incorporates driven elevator chains with blades passing along an inclined conveyor chute and adjoining grate. The apparatus is designed to remove floating and solid materials from a channel in which the gate is positioned.

U.S. Pat. No. 5,618,415 of Johnson, Jr. discloses a method for removing debris from a free flowing water supply system using a rail that is mounted adjacent to the water supply intake opening. A continuous belt made of chain link mounts around an upper sprocket cylinder and collects debris from the water flowing though the belt. Connectors with lifters move the debris collected on the front side and tilt and dump any debris of excessive weight back into the water. A water pressure jet sprays the remaining debris from the belt back into the water system.

DISCLOSURE OF THE INVENTION

A problem that is relative to pillars and support structures over waterways is that debris collects in front and causes untold damage. This damage may be realized in all cases, regardless of how many different strength materials may be used to construct the support structures. Some pillars are reinforced concrete or metal and stand up to the force of the water flow reasonably well, however, by far the most common and widely used material is wood, usually in a cylindrical shape which by its very nature is weaker and subject to deterioration. A good example of these cylindrical wooden support structures can be seen on piers. The major problem with wooden support structures is that if they break or collapse they could cause substantial damage and/or injuries to persons nearby.

A major cause of support structure failure in any material results from the collection of debris in the water that becomes entangled and attached to the support structures. Whenever debris is collected over an extended period of time, the debris is the cause of severe weakening of the structural integrity of the support. Eventually, the base material becomes so weak that the buttress(es) are incapable of supporting the bridges and they break, thus causing the bridge to collapse. Additionally, the accumulation of debris can cause waterway damming which can result in a rise in the water level which in turn can produce flooding damaging to the environment.

In view of the above disclosure, it is the primary object of the invention to mount a deflector directly in front of the structure in the path of the water current flowing past the structure that diverts the debris around the structure during times of storms or when excessive debris is present in the water flow path.

An important object of the invention is to provide a deflector that does not permit any floating objects to lodge or get wedged in front. This is accomplished by the utilization of a rotatable cylinder that is free to turn by the energy of the current flow. Continual rotation is accomplished by the use of fins that protrude outward and catch the movement of the water. Since the deflector rotation is basically the same as the water velocity, any debris striking the cylinder simply follows its rotational direction along with the flow and bypasses the structure completely.

Another object of the invention is that the cylinders may be located in a fixed position where the water flow is regulated and only occasional debris is accumulated during storms and excessive conditions. Further, the cylinders may be installed on axles that permit the cylinder(s) to slide up and down according to the water level, as they are filled with closed cell foam which allows them to easily float.

Still another object of the invention permits the entire structure to be protected using multiple cylinders that are permanently mounted on the surface and extending along the entire height of the pillar or buttress.

Yet another object of the invention is that the cylinders may be left hollow and fill with water, thus making them neutral in buoyancy, which permits them to protect the structure beneath the water line, thereby eliminating the possibility of catching and retaining green growth and tumbling debris.

A further object of the invention is that a myriad of bracket types may be utilized to mount the cylinder onto the structure according to the actual usage and specific problems of the application.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a side elevation view of an alternate embodiment of the cylinder with longitudinal radial fins, shown completely removed from the invention for clarity.

FIG. 6 is an arbitrary cross sectional view of the cylinder filled with polyurethane foam.

FIG. 7 is a partial cut away side elevation view of a brush diverter with a vertical and a sloping section and the cylinder mounted on a sliding section.

FIG. 8 is a partial cut away side elevation view of a storm drain with cylinders mounted on the corners to prevent obstruction through the open area.

FIG. 9 is a isometric view of the preferred embodiment mounted on the pillar of a bridge.

FIG. 10 is a close up isometric view of the preferred embodiment mounted on a single hexagonal shaped bridge pillar with an attachment plate clamp.

FIG. 11 is a close up isometric view of the preferred embodiment mounted on a round single bridge pillar near the top with a band clamp.

BEST MODE FOR CARRYING OUT THE INVENTION

The best mode for carrying out the invention is presented in terms of a preferred embodiment which discloses a bridge pillar deflection apparatus 10 that is attached to a pillar supporting a structure located on a waterway, such a bridge or a culvert. Any floating debris that strikes the apparatus is then deflected downstream. The preferred embodiment of the apparatus 10, as shown in FIGS. 1 through 16, is comprised of debris deflecting cylinder support brackets 12 and at least one debris deflecting cylinder 30.

Figure 1:
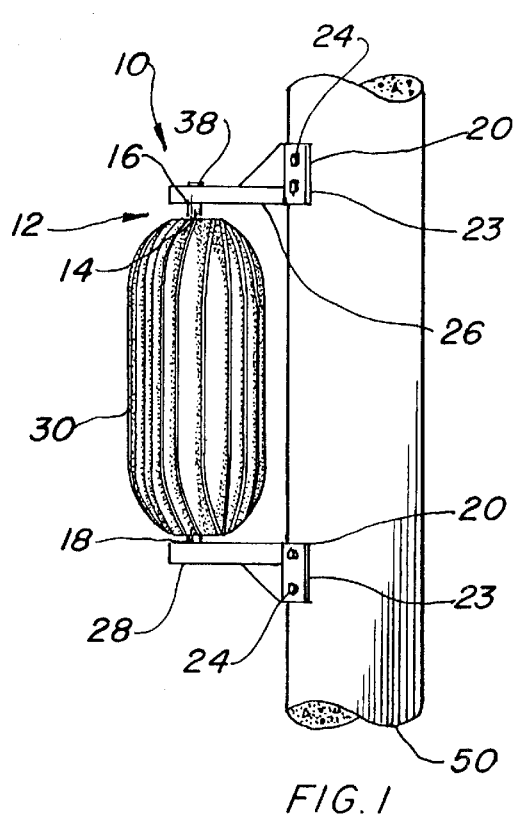
FIG. 1 is a side elevation view of a single cylinder in the preferred embodiment attached to a vertical pillar with brackets.
Figure 2:
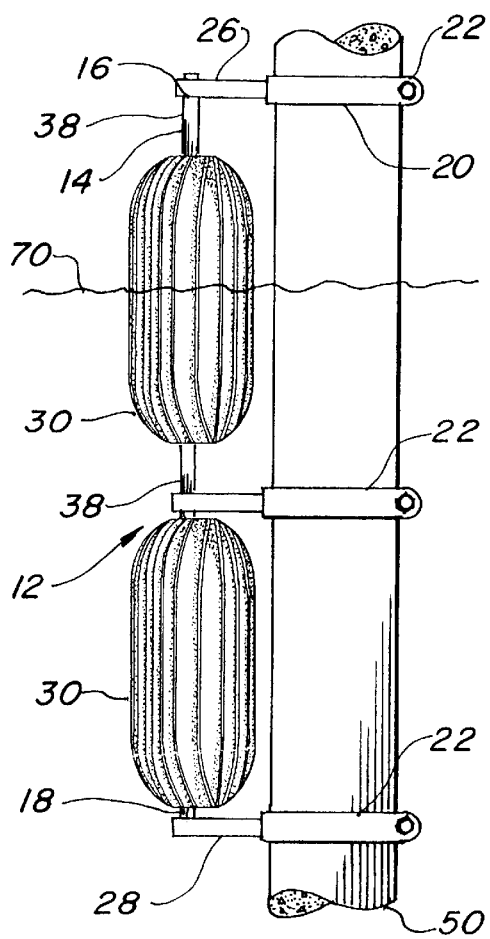
FIG. 2 is a side elevation view of a pair of cylinders in the preferred convex upper and lower end embodiment, jointly attached to a vertical pillar with three cylinder support brackets.

The cylinder support bracket 12, as shown in FIGS. 1, 2, and 7–11, includes means for being attached to a pillar 50. Typically, this means consists of a vertical section 14 or more specifically an axle 38 having an upper end 16 and a lower end 18 that are connected by attachment means 20. The attachment means consists of an integrally formed band 22 that wraps around the pillar 50 or an integrally formed attachment plate 23 which is attached to the pillar 50 with a plurality of fasteners 24, either for metal or concrete as the application requires. Both attachment means are shown in the figures with FIGS. 1, 7, 8 and showing the plate 23, and FIGS. 2, 9 and 11 illustrating the band 22.

Figure 14:
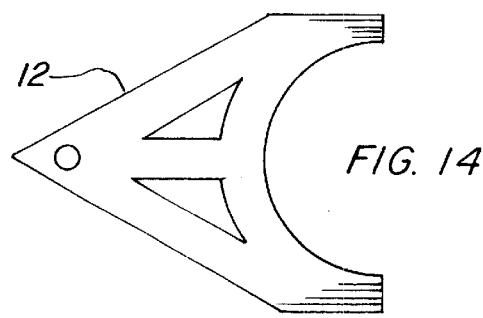
FIG. 14 is a top view of another embodiment of the cylinder support bracket.
Figure 15:
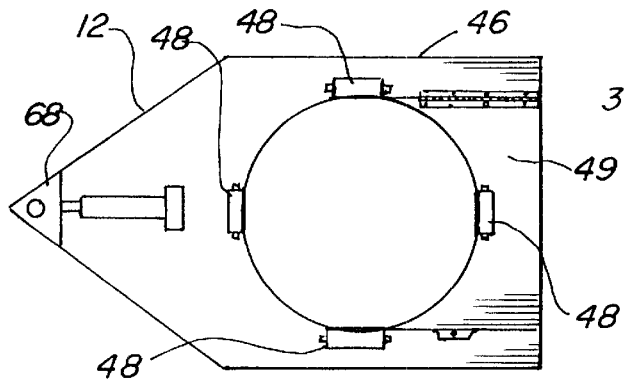
FIG. 15 is a top view of a movable cylinder support bracket.

On the upper end 16 of the axle 38 is an upper horizontal attachment bracket 26. Likewise, on the lower end 18 is a lower horizontal attachment bracket 28. The upper and lower horizontal attachment brackets 26 and 28, as shown in FIGS. 1 and 2, may be vertically spaced to accommodate one or a plurality of vertically aligned cylinders 30. An apparatus that includes one cylinder 30 is shown in FIG. 1 and an apparatus having both an upper vertically aligned cylinder 30 and a lower vertically aligned cylinder 30 is shown in FIG. 2. While the brackets illustrated in FIGS. 1, 2, 7–11 are the preferred type, many other configurations may be used with equal ease such as those depicted in FIGS. 14 and 15. Bridge pillars, or pylons, are varied in not only their diameter or breadth but may even taper in height while others may be polygonal in shape, therefore, no bracket will fit every application. It should be understood that other specialized brackets, such as shown in FIGS. 14 and 15, are also within the scope of the invention. Specifically, FIG. 14 is a cylinder support bracket 12 formed of thermoplastic and configured to fit a round pillar 50 with simple angle brackets added in the field assembly to complete the connection to the structure. FIG. 15 is for a movable bracket 46 that may be used on both the top and bottom. This particular design has an opening in the center to receive the pillar 50 and rollers 48 on the periphery which slideably engage its outside surface. A wedge-shaped shock absorbing, forward projection 68 is installed on the front of the movable bracket 46, thus providing some resiliency to the apparatus 10 if a large heavy object strikes the cylinder 30 under the full force of the water current, preventing breakage or deformation of the bracket. The rollers 48 permit the cylinder 30 to follow the water line 70 or level up or down the entire height of the pillar 50, and the amount of buoyancy required for a particular application. The base plate may include a hinged portion 49 at an optional location for ease of installation in the field.

Figure 16:
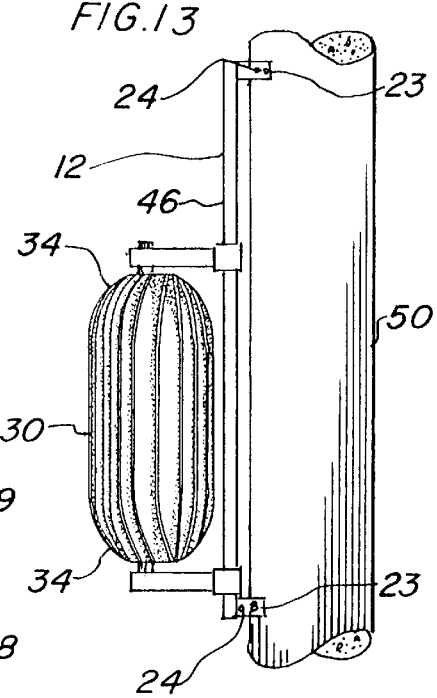
FIG. 16 is a side elevation view a sliding cylinder on a movable cylinder support bracket with a track.

The apparatus 10 may also be attached to a well known concrete structure within a waterway known as a brush diverter 52 which normally includes a vertical section 54 and a upward sloping section 56 as shown in FIG. 7. To the vertical section 54 is attached the cylinder 30 by means of the cylinder support bracket 12 with attachment means 20. To the surface of the upward sloping section 56 is attached a cylinder slide assembly 58 having a sliding section 60. Mounted to the sliding section 60 is attached a moving cylinder 30 by means of a modified cylinder support bracket 12. The sliding section 60 allows the moving cylinder 30 to move on the sliding section 60 as shown in broken lines in FIG. 7. The cylinder 30 moves upward as the water level increases to continually permit debris to be deflected downstream. Another embodiment using the sliding section 60 is illustrated in FIG. 16 wherein the sliding section 60 and accompanying bracket 12 is attached vertically to a pillar 50.

The cylinders 30 may also be mounted to the corners 64 of culverts, bridge abutments or storm drains 62 as shown in FIG. 8. This prevents debris from accumulating at the opening 66 of a storm drain 62 or the like, by deflecting the debris into the drain opening and allowing it to be carried away by the flow of water.

The cylinders 30 include a top and a bottom and are preferably constructed in a rotational mold of a low density polyurethane having a thickness of from 0.125 inches (0.318 cm) to 0.375 inches (0.952 cm) with 0.25 inches (0.64 cm) preferred. The cylinders by themselves have some positive floatation since the specific gravity of the base material is from 0.910 to 0.925, which allows the cylinder 30 to maintain its relative vertical position in the water regardless of its level. It should be noted that the addition of only a small amount of ballast, or by simply filling the cylinder with water, may achieve a neutral floatation. Alternatively, when two cylinders 30 are employed, the upper cylinder has a positive floatation while the lower hollow cylinder may be filled with water and have neutral floatation. The lower cylinder in this configuration is therefore located below the water line 70, and even if the cylinder does not rotate, the finned design of the cylinder will cause at least the majority of submerged debris to be deflected, basically eliminating the possibility of catching and retaining green growth and tumbling debris. To assure the positive floatation, the hollow cylinder may be filled with a closed cell polyurethane foam 31 as shown in FIG. 6.

Figure 3:
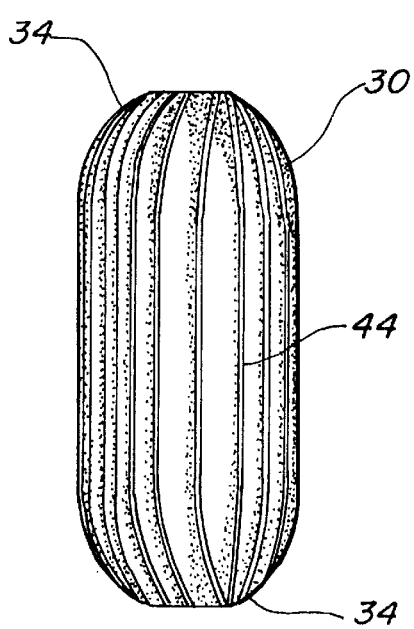
FIG. 3 is a side elevation view of the cylinder in the preferred embodiment shown completely removed from the invention for clarity.
Figure 4:
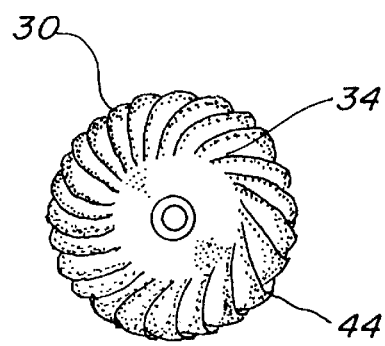
FIG. 4 is a top view of the cylinder in the preferred embodiment shown completely removed from the invention for clarity.

The cylinder 30 includes means to be rotated by water currents flowing thereupon in the form of fins 44 integrally formed into its outside surface as shown in FIGS. 3 and 4, which are preferably straight fins longitudinally angled from 5 to 90 degrees, with 10–14 degrees being favored. Each fin 44 also has a concave shape much like that of an attic turbine ventilator as referenced from the impinging direction of the water flow. The cylinder 30, as shown in FIG. 5, may alternatively have fins that are formed with a concave radius, as illustrated, with the radius varying in relation to the length of the cylinder 30. The concave radius is also referenced from the impinging direction of the water flow. The cylinders 30 preferably have a diameter that is essentially the same breadth as the bridge pillar to which the apparatus 10 is to be attached, which ranges from 6 inches (40.6 cm) to feet (3.1 meters).

Figure 12:
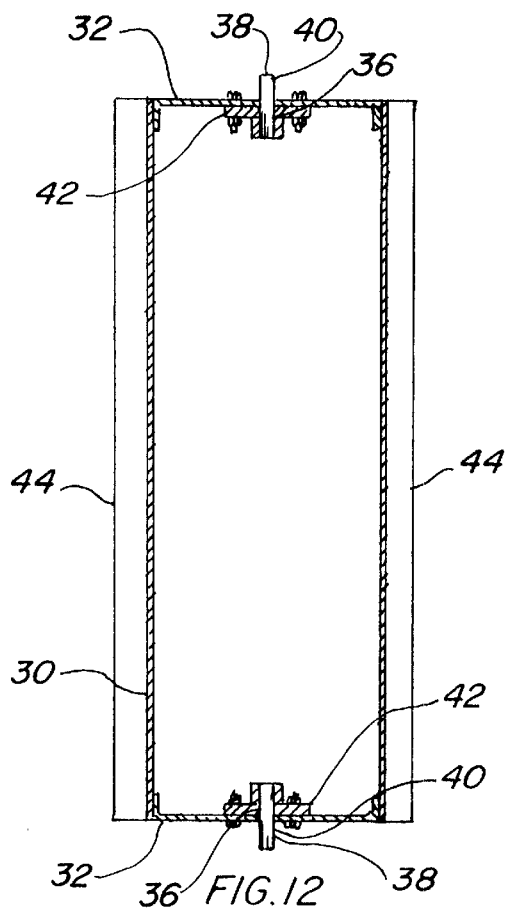
FIG. 12 is an arbitrary cross sectional view of the cylinder less any polyurethane foam in the embodiment having a flat upper and lower cap.

The cylinder 30 preferably is formed with integral convex upper and lower ends 34 on the top and bottom, as shown in FIGS. 1–6, or an optional flat upper and lower cap 32 on the top and bottom may be used, as shown in FIGS. 7 and 12, thereby forming a hollow interior. In either design the cylinder 30 has a centered axle bore 36 on both the top and bottom or the upper and the lower ends as best shown in cross section of FIGS. 6, 12 and 13. Into the bores 36 is inserted an axle 38 in the shape of a round rod having outer ends 40 running completely through and protruding therefrom for attachment to the upper and lower horizontal attachment brackets 26 and 28. Alternatively, into the centered axle bores 36 is inserted and attached respectively the axle 38 split into two separate pieces, thus constituting an upper and a lower axle 38 as shown in FIG. 12. In this configuration, means are provided to secure the axle prior to assembling the upper and lower caps 32. Each centered axle bore 36 includes a thermoplastic or metal bearing 42 to afford smooth axle rotation. The thermoplastic bearing is preferably fabricated of ultra high molecular weight polyurethane which is better known in the industry as UHMW, in the cylindrical form or as a flanged pillow block. Other materials such as nylon, Teflon and the like may also be used with equal ease and dispatch. The metal bearing 42 may be the ball bearing type or any other bearing applicable to the application, as many types are available in today's marketplace. In lieu of the thermoplastic or composite metal bearing, the axle bore can be drilled into a self-lubricating material such as oil impregnated bronze forming a customized self-lubricating bearing.

Figure 13:
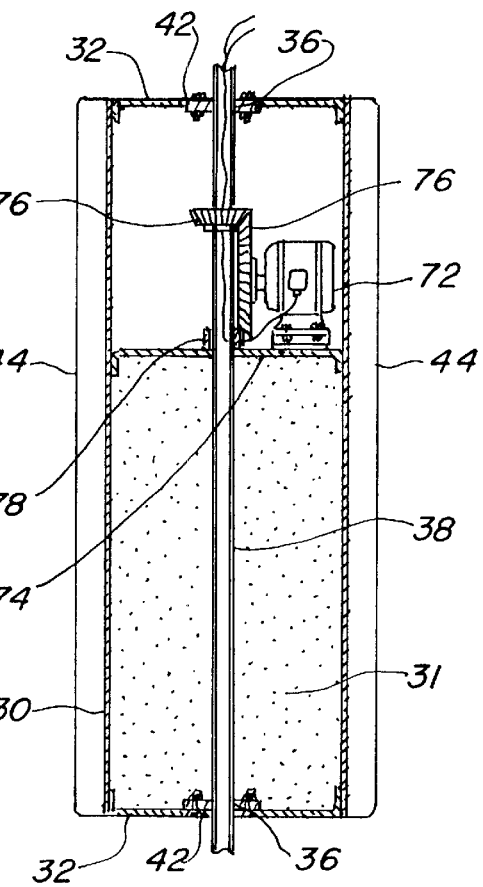
FIG. 13 is a arbitrary cross sectional view of the cylinder partially filled with polyurethane foam and a electrical generator installed inside.

The primary utility of the apparatus 10, as previously disclosed, is to prevent the accumulation of debris from a bridge pillar 50, a brush diverted 52, a culvert or a storm drain 62. It may be appreciated however that the rotating motion of the cylinder 30 may also be utilized to drive a generator which produces electricity. This electricity may be used directly or be stored in an electricity storage means for later use. FIG. 13 illustrates the basic concept with the cylinder 30 partially filled with foam 31 and a electrical generator 72 mounted on a bulkhead 74 with a set of spur gears 76 attached to the both the generator 72 and the axle 38. The electrical energy is transmitted from the generator 72 via wires through a set of slip rings 78 to the inside diameter of a hollow axle. The power produced may be either direct current of alternating current as the application demands. This electric power may be used, as an example, to light an indicating light 80 such as illustrated in FIG. 9 to visually verify, from a remote location, that the drum is properly rotating. Obviously, other uses may be found for the power generated as the potential energy of the water is available at no additional expenditure and cylinder rotation is an essential function of the invention.

While the invention has been described in complete detail and pictorially shown in the accompanying drawings, it is not to be limited to such details, since many changes and modifications may be made in the invention without departing from the spirit and scope thereof. For example, the cylinders 30 may be mounted in a horizontal plane, such as under the roadway of a bridge, also, quickly erectable cylinder support brackets may be provided to allow a cylinder to be hastily attached during an emergency such as during a flooding situation; and finally the cylinder 30 can be fabricated in two vertical sections. The two sections are dimensioned to be placed around a pillar 50 and rotatably attached thereto by a pillar attachment means. Hence, it is described to cover any and all modifications and forms which may come within the language and scope of the appended claims.

What is claimed is:

1. A bridge pillar debris deflection apparatus that attaches to a pillar supporting a structure located on a water way, said apparatus comprising:
   a) a cylinder support bracket having:
      (1) means for bring attached to the pillar,
      (2) an upper horizontal attachment bracket, and
      (3) a lower horizontal attachment bracket, and
   b) at least one vertically finned, positive flotation cylinder having an upper end rotatably attached to said upper horizontal attachment bracket, and a vertically finned cylinder fixedly attached to said lower horizontal attachment bracket, all cylinders having a plurality of fins integrally on an outside surface thereof wherein when said cylinders are rotated by a force of moving water influenced by water currents as long as water continues to flow thereupon, such that any debris striking said cylinders will be deflected to maintain the pillar free from a built-up of debris.

2. A process for attaching a bridge pillar debris deflection apparatus rotatably attached to a cylinder support bracket that is attached to a bridge pillar supporting a structure located on a water way, said process comprising the following steps:

a) select and clean a bridge pillar of debris,
b) determine the center of the bridge pillar to which at least one pillar debris deflection apparatus is to be installed,
c) center and attach a cylinder support bracket to the bridge pillar, the cylinder support bracket having an upper horizontal attachment bracket and a lower horizontal attachment bracket,
d) attach at least one vertically finned, positive flotation cylinder having an upper end rotatably attached to said upper horizontal attachment bracket, said at least one cylinder having a plurality of fins integrally on an outside surface thereof,
e) fixedly attach a vertically finned cylinder having a plurality of fins integrally on an outside surface thereof to said lower horizontal attachment bracket,
f) lower said rotatably attached at least one positive flotation cylinder into the water way to allow said cylinder to be rotated by a force of moving water influenced by water currents as long as water continues to flow thereupon, wherein when said at least one positive flotation cylinder rotates, any debris striking said at least one positive flotation cylinder will be deflected to maintain the pillar free from a build-up of debris.

* * * * *